(12) United States Patent
Cheng

(10) Patent No.: US 12,174,902 B2
(45) Date of Patent: Dec. 24, 2024

(54) RANKING OF RECALL DATA

(71) Applicant: BEIJING BAIDU NETCOM SCIENCE TECHNOLOGY CO., LTD., Beijing (CN)

(72) Inventor: Zhou Cheng, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/016,754

(22) PCT Filed: Jul. 25, 2022

(86) PCT No.: PCT/CN2022/107627
§ 371 (c)(1),
(2) Date: Jan. 18, 2023

(87) PCT Pub. No.: WO2023/142406
PCT Pub. Date: Aug. 3, 2023

(65) Prior Publication Data
US 2024/0104154 A1    Mar. 28, 2024

(30) Foreign Application Priority Data
Jan. 30, 2022   (CN) .......................... 202210113572.5

(51) Int. Cl.
*G06F 16/9538*   (2019.01)
*G06N 3/0455*   (2023.01)

(52) U.S. Cl.
CPC ....... *G06F 16/9538* (2019.01); *G06N 3/0455* (2023.01)

(58) Field of Classification Search
CPC .......................... G06F 16/9538; G06N 3/0455
See application file for complete search history.

(56) References Cited

U.S. PATENT DOCUMENTS

| 10,706,453 | B1 * | 7/2020 | Morin .................... G06N 20/20 |
| 2009/0204415 | A1 | 8/2009 | Baiera |
| 2012/0233159 | A1 | 9/2012 | Datta et al. |

(Continued)

FOREIGN PATENT DOCUMENTS

| CN | 110083688 A | 8/2019 |
| CN | 111563158 A | 8/2020 |
| CN | 111581545 A | 8/2020 |

(Continued)

OTHER PUBLICATIONS

CN 112329954 A Translated (Year: 2021).*

(Continued)

*Primary Examiner* — Maher N Algibhah
(74) *Attorney, Agent, or Firm* — Leydig, Voit & Mayer, Ltd.

(57) ABSTRACT

A method is provided that includes: determining a plurality of recall data associated with data to be searched; determining, for each recall data of the plurality of recall data, a recommendation degree of the recall data based on a similarity between the recall data and each recall data of the plurality of recall data; and ranking the recall data in the plurality of recall data based on the recommendation degree of each recall data of the plurality of recall data.

12 Claims, 5 Drawing Sheets

(56) References Cited

U.S. PATENT DOCUMENTS

| | | |
|---|---|---|
| 2018/0268064 A1 | 9/2018 | Deluca et al. |
| 2022/0019739 A1 | 1/2022 | Hu et al. |

FOREIGN PATENT DOCUMENTS

| | | | |
|---|---|---|---|
| CN | 112329954 A | * | 2/2021 |
| CN | 112541110 A | | 3/2021 |
| CN | 113515690 A | | 10/2021 |
| CN | 113705315 A | | 11/2021 |
| CN | 113742580 A | | 12/2021 |
| CN | 113821646 A | | 12/2021 |
| CN | 113987161 A | | 1/2022 |
| CN | 114329181 A | * | 4/2022 |
| CN | 114443989 A | | 5/2022 |
| JP | 201492955 A | | 5/2014 |
| JP | 2021190073 A | | 12/2021 |
| WO | 2020168839 A1 | | 8/2020 |

OTHER PUBLICATIONS

Shan, Qishang et al., "Multimodal Sentiment Analysis Based on Transformer and Low-rank Fusion," 2021 China Automation Congress (CAC), pp. 4360-4365 (Oct. 22-24, 2021).

Chen, Zhi-tao et al., "Citation recommendation algorithm based on multi-feature factor fusion," Computer Engineering and Design, vol. 39, No. 7, pp. 1895-1903 (Jul. 2018).

Li, Sijie, "Research on Braille Book Recommendation System Based on Fusion Preference and User Attention," A Dissertation Submitted to Zhejiang University for the Degree of Master of Engineering, Collage of Computer Science, Zhejiang University (Jan. 2019).

Ma, Zhen et al., "Research on the Method of Identifying the Similarity of Commodity Titles Based on Siamese Network," Information Recording Material, vol. 21, No. 9, pp. 162-163 (Sep. 2020).

* cited by examiner

RANKING OF RECALL DATA

CROSS-REFERENCE TO RELATED APPLICATIONS

This application is a National Stage of International Application No. PCT/CN2022/107627, filed on Jul. 25, 2022, which claims priority to Chinese Patent Application No. 202210113572.5, filed on Jan. 30, 2022. The disclosures of both of the aforementioned applications are hereby incorporated by reference in their entireties for all purposes.

TECHNICAL FIELD

The present disclosure relates to the technical field of artificial intelligence, particularly relates to the technical field of intelligent search, and specifically relates to a method for ranking, an electronic device, and a computer readable storage medium.

BACKGROUND

Artificial intelligence is a subject for studying to enable a computer to simulate a certain thought process and intelligent behavior (such as learning, reasoning, thinking and planning) of people, and has both a technology in a hardware level and a technology in a software level. An artificial intelligence hardware technology generally includes technologies such as a sensor, a dedicated artificial intelligence chip, cloud computing, distributed storage and big data processing. An artificial intelligence software technology mainly includes several major directions of a computer vision technology, a speech recognition technology, a natural language processing technology, machine learning/deep learning, a big data processing technology, a knowledge mapping technology, etc.

A method described in this part is not necessarily a method that has been conceived or employed previously. Unless otherwise specified, it should not be assumed that any method described in this part is regarded as the prior art only because it is included in this part. Similarly, unless otherwise specified, a problem mentioned in this part should not be regarded as being publicly known in any prior art.

SUMMARY

According to one aspect of the present disclosure, a method is provided, which includes: determining a plurality of recall data associated with data to be searched; determining, for each recall data of the plurality of recall data, a recommendation degree of the recall data based on a similarity between the recall data and each recall data of the plurality of recall data; and ranking the recall data in the plurality of recall data based on the recommendation degree of each recall data of the plurality of recall data.

According to one aspect of the present disclosure, an electronic device is provided, which includes: a processor; and a memory communicatively connected to the processor, wherein the memory stores instructions executable by the processor, and the instructions, when executed by the processor, are configured to cause the processor to perform operations including: determining a plurality of recall data associated with data to be searched; determining, for each recall data of the plurality of recall data, a recommendation degree of the recall data based on a similarity between the recall data and each recall data of the plurality of recall data; and ranking the recall data in the plurality of recall data based on the recommendation degree of each recall data of the plurality of recall data.

According to one aspect of the present disclosure, a non-transitory computer readable storage medium storing computer instructions is provided, wherein the computer instructions, when executed by a processor, enable a computer to perform operations including: determining a plurality of recall data associated with data to be searched; determining, for each recall data of the plurality of recall data, a recommendation degree of the recall data based on a similarity between the recall data and each recall data of the plurality of recall data; and ranking the recall data in the plurality of recall data based on the recommendation degree of each recall data of the plurality of recall data.

BRIEF DESCRIPTION OF THE DRAWINGS

Accompanying drawings show the embodiments, constitute a part of the specification, and together with text description of the specification, serve to explain example implementations of the embodiments. The shown embodiments are only for the purpose of illustration, and do not limit the scope of the claim. In all the accompanying drawings, the same reference numerals refer to the similar but not necessarily the same elements.

DETAILED DESCRIPTION

The example embodiments of the present disclosure are illustrated below with reference to the accompanying drawings, including various details of the embodiments of the present disclosure for aiding understanding, and they should be regarded as being only example. Therefore, those skilled in the art should realize that various changes and modifications may be made on the embodiments described here without departing from the scope of the present disclosure. Similarly, for clarity and simplicity, the following description omits description of a publicly known function and structure.

In the present disclosure, unless otherwise noted, describing of various elements by using terms "first", "second" and the like does not intend to limit a position relationship, a time sequence relationship or an importance relationship of these elements, and this kind of terms is only used to distinguish one element from another element. In some examples, a first element and a second element may refer to the same instance of this element, while in certain cases, they may also refer to different instances based on the contextual description.

The terms used in description of various examples in the present disclosure are only for the purpose of describing the specific examples, and are not intended for limitation. Unless otherwise explicitly indicated in the context, if the quantity of the elements is not limited specially, there may be one or more elements. In addition, the term "and/or" used in the present disclosure covers any one of and all possible combination modes in the listed items.

A search task may generally be divided into two parts of recall and ranking. In the related art, a plurality of recall data are recalled based on data to be searched in a recall process. In a ranking process, a recommendation degree of the recall data is determined according to a feature of each recall data, such as similarity between the recall data and the data to be searched, and then rank the plurality of recall data. This ranking mode ignores contextual information between the plurality of recall data, resulting in poor ranking accuracy.

Based on this, the present disclosure provides a method for ranking. For each recall data of the plurality of recall data, a recommendation degree of the recall data in the plurality of recall data is determined based on a similarity between the recall data and each recall data of the plurality of recall data, and then rank the plurality of recall data. Thus, a relationship between the plurality of recall data can be obtained in a ranking process, and a ranking quality of the plurality of recall data is improved based on this.

The embodiments of the present disclosure will be described below in detail with reference to the accompanying drawings.

Figure 1:
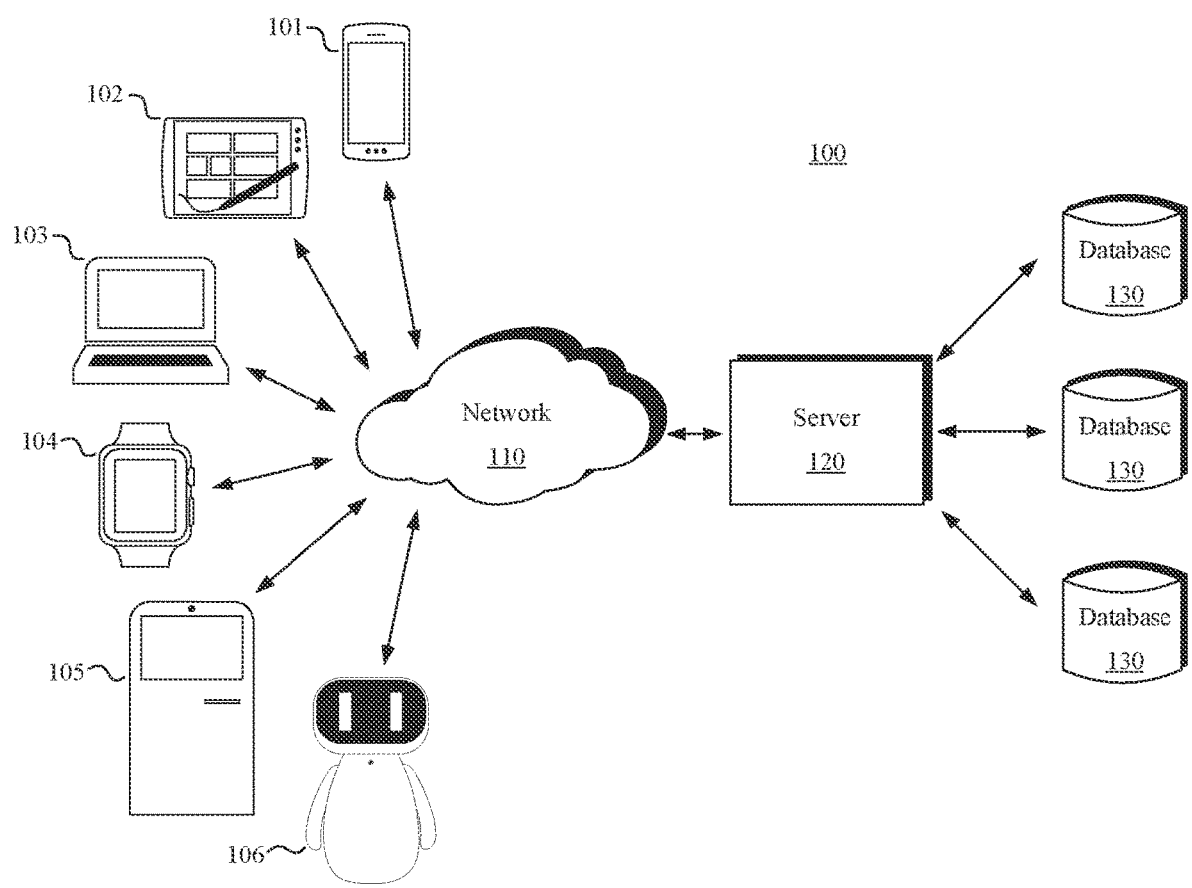
FIG. 1 shows a schematic diagram of an example system in which various methods described herein may be implemented according to some embodiments of the present disclosure.

FIG. 1 shows a schematic diagram of an example system 100 in which various methods and apparatuses described herein may be implemented according to some embodiments of the present disclosure. Referring to FIG. 1, the system 100 includes one or more client devices 101, 102, 103, 104, 105 and 106, a server 120, and one or more communication networks 110 for coupling the one or more client devices to the server 120. The client devices 101, 102, 103, 104, 105 and 106 may be configured to execute one or more application programs.

In the embodiments of the present disclosure, the server 120 may run to be capable of executing one or more services or software applications of a method for ranking or a method for training a ranking model.

In certain embodiments, the server 120 may further provide other services or software applications which may include a non-virtual environment and a virtual environment. In certain embodiments, these services may serve as a web-based service or cloud service to be provided, for example, be provided to users of the client devices 101, 102, 103, 104, 105 and/or 106 under a software as a service (SaaS) model.

In configuration shown in FIG. 1, the server 120 may include one or more components for implementing functions executed by the server 120. These components may include a software component, a hardware component or their combinations capable of being executed by one or more processors. The users operating the client devices 101, 102, 103, 104, 105 and/or 106 may sequentially utilize one or more client application programs to interact with the server 120, so as to utilize the service provided by these components. It should be understood that various different system configurations are possible, which may be different from the system 100. Therefore, FIG. 1 is an example of a system used for implementing various methods described herein, and is not intended for limitation.

The users may use the client devices 101, 102, 103, 104, 105 and/or 106 to input and send data to be searched. The client devices may provide an interface that enables the users of the client devices to be capable of interacting with the client devices. The client devices may further output information to the users via the interface. Although FIG. 1 only describes the six client devices, those skilled in the art will understand that the present disclosure may support any quantity of client devices.

The client devices 101, 102, 103, 104, 105 and/or 106 may include various types of computer devices, such as a portable handheld device, a general-purpose computer (such as a personal computer and a laptop computer), a workstation computer, a wearable device, an intelligent screen device, a self-service terminal device, a service robot, a game system, a thin client, various message transceiving devices, a sensor or other sensing devices, etc. These computer devices may run various types and versions of software application programs and operating systems, such as MICROSOFT Windows, APPLE iOS, a UNIX-like operating system, Linux or Linux-like operating system (such as GOOGLE Chrome OS); or include various mobile operating systems, such as MICROSOFT Windows Mobile OS, iOS, Windows Phone, and Android. The portable handheld device may include a cellular phone, an intelligent telephone, a tablet computer, a personal digital assistant (PDA), etc. The wearable device may include a head-mounted display (such as smart glasses) and other devices. The game system may include various handheld game devices, a game device supporting Internet, etc. The client devices can execute various different application programs, such as various Internet-related application programs, a communication application program (such as an electronic mail application program), and a short message service (SMS) application program, and may use various communication protocols.

A network 110 may be any type of network well known by those skilled in the art, and it may use any one of various available protocols (including but not limited to TCP/IP, SNA, IPX, etc.) to support data communication. As an example only, the one or more networks 110 may be a local area network (LAN), an Ethernet-based network, a Token-Ring, a wide area network (WAN), an Internet, a virtual network, a virtual private network (VPN), an intranet, an extranet, a public switched telephone network (PSTN), an Infrared network, a wireless network (such as Bluetooth and WIFI), and/or any combination of these and/or other networks.

The server 120 may include one or more general-purpose computers, dedicated server computers (such as personal computer (PC) servers, UNIX servers, and midrange servers), blade servers, mainframe computers, server clusters or any other proper arrangements and/or combinations. The server 120 may include one or more virtual machines running a virtual operating system, or other computing architectures involving virtualization (such as one or more flexible pools of a logic storage device capable of being virtualized so as to maintain a virtual storage device of the server). In various embodiments, the server 120 may run one or more services or software applications providing the functions described hereunder.

A computing unit in the server 120 may run one or more operating systems including any above operating system and any commercially available server operating system. The server 120 may further run any one of various additional server application programs and/or a middle tier application program, including an HTTP server, an FTP server, a CGI server, a JAVA server, a database server, etc.

In some implementations, the server 120 may include one or more application programs, so as to analyze and merge data feed and/or event update received from the users of the client devices 101, 102, 103, 104, 105 and/or 106. The server 120 may further include one or more application programs, so as to display the data feed and/or a real-time event via one or more display devices of the client devices 101, 102, 103, 104, 105 and/or 106.

In some implementations, the server 120 may be a server of a distributed system, or a server in combination with a blockchain. The server 120 may also be a cloud server, or an intelligent cloud computing server or an intelligent cloud host with an artificial intelligence technology. The cloud server is a hosting product in a cloud computing service system, so as to overcome the defects of large management difficulty and weak business scalability in service of a traditional physical host and a virtual private server (VPS).

The system 100 may further include one or more databases 130. In certain embodiments, these databases may be used to store data and other information. For example, one or more of the databases 130 may be used to store information such as an audio file and a video file. The databases 130 may be resident at various locations. For example, a database used by the server 120 may be locally at a server 120, or may be away from the server 120 and may be in communication with the server 120 via network-based or dedicated connection. The databases 130 may be different types. In certain embodiments, the database used by the server 120 may be, for example, a relational database. One or more of these databases may store, update and retrieve data to the database and from the database in response to a command.

In certain embodiments, one or more of the databases 130 may further be used by the application program to store application program data. The database used by the application program may be different types of databases, such as a key value memory pool, an object memory pool, or a conventional memory pool supported by a file system.

The system 100 in FIG. 1 may be configured and operated in various modes, so as to be capable of applying various methods and apparatuses described according to the present disclosure.

In the technical solution of the present disclosure, related processing such as collecting, storing, using, processing, transmitting, providing and disclosing of user personal information all conforms to provisions of relevant laws and regulations, and does not violate public order and moral.

Figure 2:
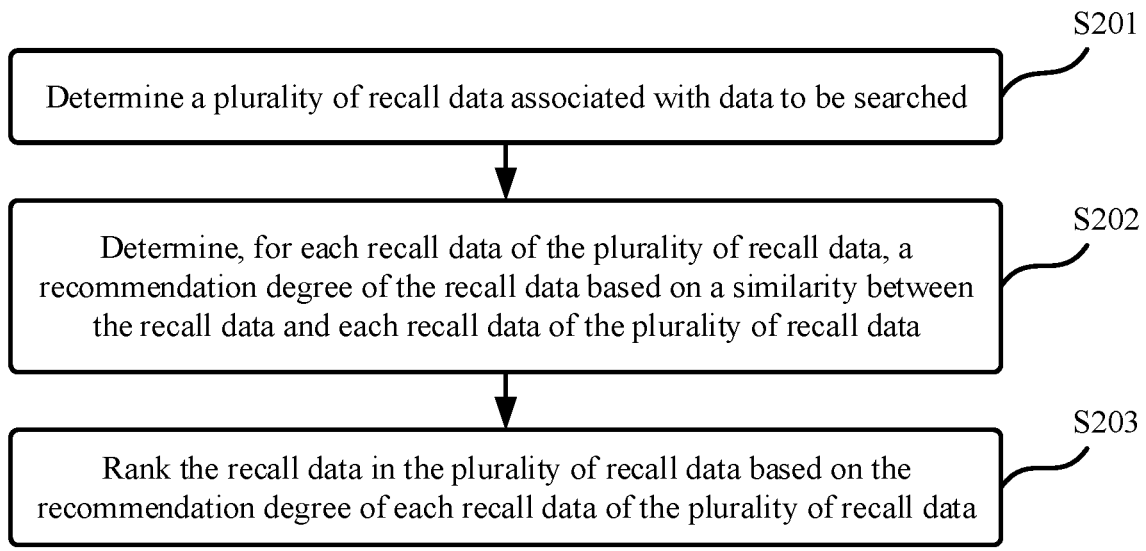
FIG. 2 shows a flow diagram of a method for ranking according to some embodiments of the present disclosure.

FIG. 2 shows a flow diagram of a method for ranking according to some embodiments of the present disclosure. The method 200 includes: step S201, determine a plurality of recall data associated with data to be searched; step S202, for each recall data of the plurality of recall data, determine a recommendation degree of the recall data based on a similarity between the recall data and each recall data of the plurality of recall data; and step S203, rank the recall data in the plurality of recall data based on the recommendation degree of each recall data of the plurality of recall data.

Thus, contextual information of the plurality of recall data can be considered in a ranking process, and a ranking quality of the plurality of recall data is improved based on relevance between the plurality of recall data.

At step S201, the data to be searched may be input by a user through a terminal device. The plurality of recall data may be a plurality of data associated with the data to be searched obtained from a database by using a preset recall rule or a trained recall model.

According to some embodiments, any one of the data to be searched and the plurality of recall data may include at least one of the following data types: a text; an image; or a video.

At step S202, by determining the similarity between each recall data and each recall data of the plurality of recall data, whether the recall data is worth recommending can be evaluated at a level of a data set composed of the plurality of recall data, so that the evaluation of each recall data is not only limited to internal information of the recall data, but also contextual information of the plurality of recall data can be considered, which is helpful to improve an accuracy degree of ranking the plurality of recall data.

The recommendation degree may be understood to be determined according to one or more factors of: a user satisfaction, a probability of being clicked and a matching degree with the data to be searched.

According to some embodiments, for each recall data of the plurality of recall data, the similarity may be determined based on a literal overlapping degree of the recall data and each recall data of the plurality of recall data, and thus the recommendation degree of the recall data in the plurality of recall data is determined.

For example, for each recall data, the quantity of recall data of the plurality of recall data whose similarity to the recall data is higher than a preset similarity threshold is determined, and the recommendation degree of the recall data is determined based on the quantity, wherein the recommendation degree of the recall data is positively related to the quantity.

According to some embodiments, each recall data of the plurality of recall data has a respective first feature vector, and wherein determining the recommendation degree of the recall data may include: based on a similarity between the first feature vector of the recall data and the first feature vector of each recall data of the plurality of recall data, fusing the first feature vector of each recall data of the plurality of recall data to obtain a second feature vector of the recall data; and determining the recommendation degree of the recall data based on the second feature vector of the recall data.

A second feature of each recall data obtained based on the method can reflect characteristics of the recall data on a global level of a set composed of the plurality of recall data, and then the recommendation degree of the recall data in the plurality of recall data may be more accurately determined.

The above mode of determining the second feature vector of the recall data may be realized by using an attention mechanism.

According to some embodiments, determining the recommendation degree of the recall data may include: inputting the first feature vector of each recall data of the plurality of recall data into a first transformer module to obtain the recommendation degree of the recall data.

The first transformer module may be composed of two parts of an encoder and a decoder. Based on a self-attention mechanism, the first transformer module may fully fuse the plurality of input first feature vectors, and then accurately determine the recommendation degree of each recall data of the plurality of recall data on the global level of the set composed of the plurality of recall data.

According to some embodiments, each recall data of the plurality of recall data includes a plurality of feature information, and the method may further include: for each recall data of the plurality of recall data, determining the first feature vector of the recall data by fusing the plurality of feature information of the recall data before determining the recommendation degree of the recall data in the plurality of recall data.

The first feature vector obtained by fusing the plurality of feature information of each recall data can more accurately represent the recall data at an overall level composed of the plurality of features, thereby improving the ranking quality of the plurality of recall data.

According to some embodiments, the plurality of feature information of each recall data include feature information used for representing similarity between the recall data and the data to be searched.

Thus, the similarity between the recall data and the data to be searched may be reflected from the feature level of each recall data. Further, the first feature vector obtained by fusing the plurality of feature information of the recall data may represent the similarity between the recall data and the data to be searched.

In one implementation, each feature information of the plurality of feature information of each recall data can be obtained by additional model prediction. For example, for each recall data of the plurality of recall data, the recall data and the data to be searched may be input into an additional matching model to obtain similarity information between the recall data and the data to be searched. The similarity information is used as one feature information of the recall data for ranking the recall data.

According to some embodiments, the plurality of feature information include at least one of: a numerical feature information, an enumerated feature information, or a vector feature information.

In one implementation, the numerical feature information may include, for example, a historical click rate. The enumerate feature information may include, for example, a type of a recall source of the recall data, a type of a page style and the like. The vector feature information may include, for example, a feature vector used for representing the similarity between the recall data and the data to be searched, a feature vector used for representing a site quality of the recall data, and the like.

According to some embodiments, determining the first feature vector of the recall data by fusing the plurality of feature information of the recall data may include: determining a representation vector of each feature information of the plurality of feature information; and determining the first feature vector of the recall data by fusing the representation vector of each feature information of the plurality of feature information.

Because data types of the plurality of feature information are diverse, in order to facilitate subsequent processing, each feature information of the plurality of feature information may be converted into a representation vector of a same dimension, that is, to achieve normalization of the feature information. Feature normalization is performed to successfully learn a relationship between the feature information, and is a pre step of representing the recall data as the first feature vector.

In one implementation, each numerical feature information is converted into a D-dimensional representation vector by calculating a logarithm or dividing a constant of its numerical value, wherein the dimension D of the representation vector is predetermined. For each enumerated feature information, a corresponding preset D-dimensional vector may be selected as the representation vector of the enumerated feature information according to a specific enumeration value. Each vector feature information may be expressed as one or more D-dimensional representation vectors. For example, the vector feature information may be directly converted into one D-dimensional vector through linear transformation, or converted into a plurality of D-dimensional vectors according to the dimension of vector feature information and the size of data.

According to some embodiments, determining the first feature vector of the recall data by fusing the representation vector of each feature information of the plurality of feature information may include: inputting the representation vector of each feature information of the plurality of feature information into a second transformer module to obtain the first feature vector of the recall data.

The second transformer module may be composed of an encoder. Based on an attention mechanism in the encoder, each feature information of the plurality of feature information can be fully fused, and the obtained first feature vector can more accurately represent the recall data.

According to some embodiments, inputting the representation vector of each feature information of the plurality of feature information into the second transformer module may include: arranging the representation vector of each feature information of the plurality of feature information according to a preset order to form a feature matrix of the recall data; and inputting the feature matrix into the second transformer module.

It may be understood that the present disclosure does not limit the arranging order of the plurality of feature information, but only makes the arranging order of the plurality of feature information of each recall data the same. For example, the arranging order may be preset as: "the historical click rate, the type of the page style, the similarity between the recall data and the data to be searched, and the type of the recall source". In this way, the representation vectors of the plurality of feature information of each recall data shall be all arranged in this order, so that each recall data is input into the second transformer module in the same mode.

In one implementation, for each recall data of the plurality of recall data, an additional vector is added on the basis of the representation vector of the plurality of feature information of the recall data. The additional vector has the same dimension as the representation vectors of the plurality of feature information, and can be used to extract the first feature vector of the recall data at an output end of the second transformer module, that is, the output vector obtained from the additional vector processed by the second transformer module is taken as the first feature vector of the recall data.

In particular, the additional vector may be set before or after the representation vectors of the plurality of feature information.

According to some embodiments, in response to absence of any feature information of the plurality of feature information, a preset default vector may be set at a position of the feature information in the preset order.

Because the plurality of recall data may come from a plurality of different recall sources, for example, the plurality of recall data come from different databases or are recalled through different recall models, there may be a situation where the feature information in the different recall data is not uniform, that is, a certain feature information in one recall data does not exist in another recall data. In order to avoid the inconsistency of modes of the recall data input into the second transformer module caused by the above situation, the preset default vector is employed to occupy the position of the missing feature information.

At step S203, rank the plurality of recall data based on the recommendation degree of each recall data of the plurality of recall data determined in step S202. Specifically, the plurality of recall data may be arranged sequentially according to the value of the recommendation degree and fed back to a client, so that the user can view a search result for the data to be searched through the client.

Figure 3:
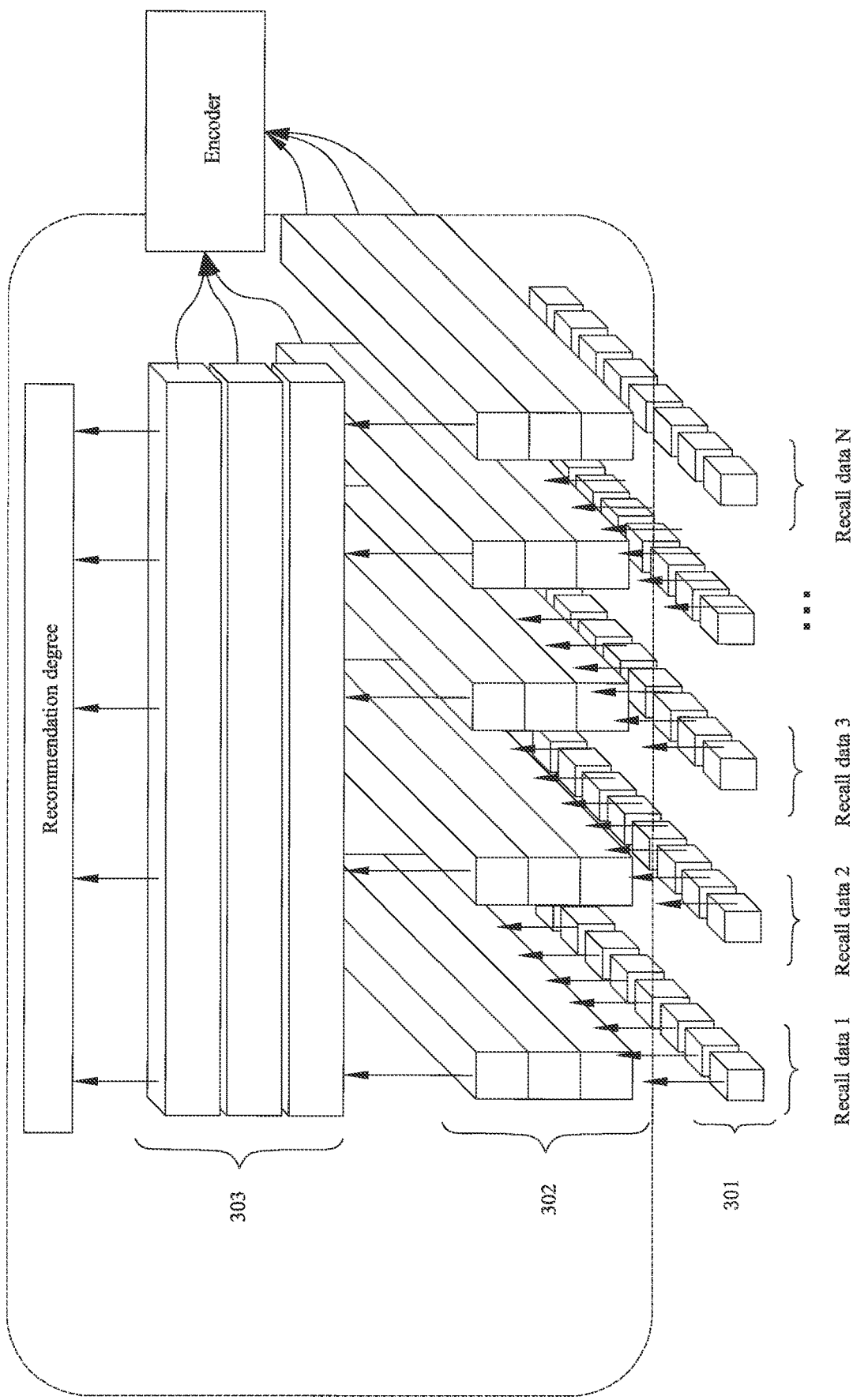
FIG. 3 shows a schematic diagram of a method for ranking according to some embodiments of the present disclosure.

FIG. 3 shows a schematic diagram of a method for ranking according to some embodiments of the present disclosure. As shown in FIG. 3, each of recall data 1 to N includes the plurality of feature information (shown by cubes in FIG. 3). By executing step 301, step 302 and step S303, the recommendation degree of each of the recall data 1 to N may be determined to execute the ranking of the recall data 1 to N. The method for ranking of the recall data 1 to N is described as follows.

At step 301, for each of the recall data 1 to N, a representation vector of each of a plurality of feature information of the recall data is determined, and a feature matrix composed of the representation vector of each of the plurality of feature information and one additional vector jointly is input into a second transformer module, wherein the additional vector locates in a first column of the feature matrix.

At step 302, for each of the recall data 1 to N, a first feature vector of the recall data is obtained through an encoder of the second transformer module, wherein the first feature vector is an output vector obtained from the additional vector processed by the encoder of the second transformer module.

At step 303, the first feature vector of each of the recall data 1 to N is input into a first transformer module, the first feature vectors of all the recall data are fused through an encoder in the first transformer module, and a second feature vector of each of the recall data 1 to N may be obtained, wherein the second feature vector of each recall data fuses information of other recall data through the encoder of the first transformer module. Finally, for each of the recall data 1 to N, a recommendation degree of the recall data is determined based on the second feature vector of the recall data.

On the basis of determining the recommendation degree of each of the recall data 1 to N, the recall data 1 to N may be ranked based on the value of the recommendation degree of each recall data.

Figure 4:
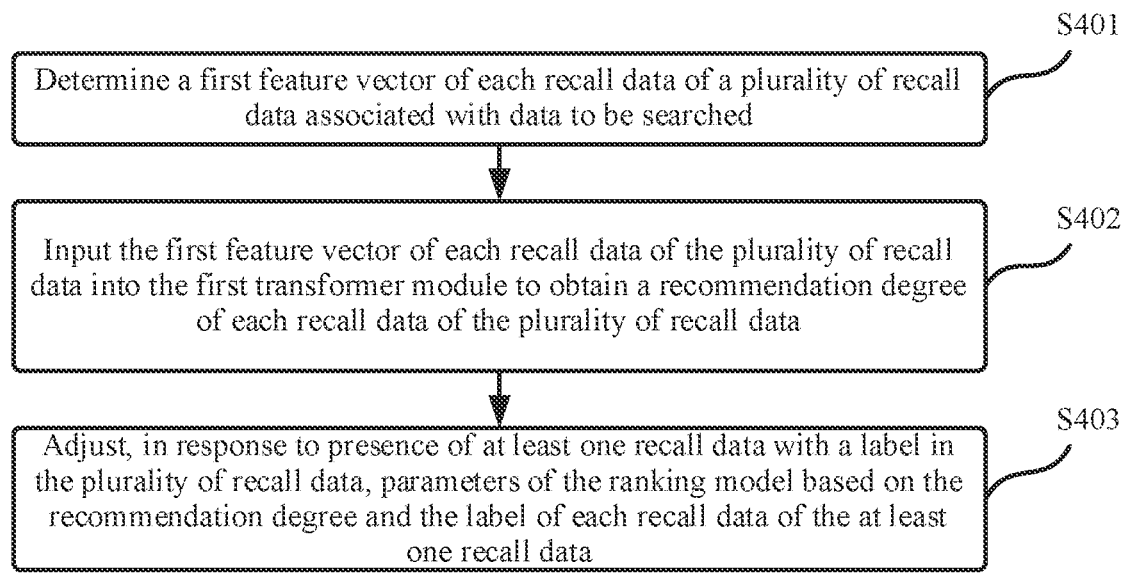
FIG. 4 shows a flow diagram of a method for training a ranking model according to some embodiments of the present disclosure.

FIG. 4 shows a flow diagram of a method for training a ranking model according to some embodiments of the present disclosure. The ranking model includes a first transformer module, and the method 400 includes: step S401, determine a first feature vector of each recall data of a plurality of recall data associated with data to be searched; step S402, input the first feature vector of each recall data of the plurality of recall data into the first transformer module to obtain a recommendation degree of each recall data of the plurality of recall data; and step S403, adjust, in response to presence of at least one recall data with a label in the plurality of recall data, parameters of the ranking model based on the recommendation degree and the label of each recall data of the at least one recall data.

The ranking model trained from the above embodiments can mine relevance between the plurality of recall data through the first transformer module, so that contextual information of the plurality of recall data can be considered in the ranking process, and ranking quality of the plurality of recall data can be improved.

The first transformer module may be composed of two parts of an encoder and a decoder. The first transformer module in the ranking model trained by the above method may fully fuse the plurality of input first feature vectors based on a self-attention mechanism, and then accurately determine the recommendation degree of each recall data of the plurality of recall data on the global level of a set composed of the plurality of recall data.

At step S401, the plurality of recall data may be a plurality of data associated with the data to be searched obtained from a database by using a preset recall rule or a trained recall model.

According to some embodiments, the ranking model further includes a second transformer module, each recall data of the plurality of recall data includes a plurality of feature information, and wherein determining the first feature vector of each recall data of the plurality of recall data includes: determining a representation vector of each feature information of the plurality of feature information of the recall data; and inputting the representation vector of each feature information of the plurality of feature information into the second transformer module to obtain the first feature vector of the recall data.

The second transformer module may be composed of an encoder. The trained second transformer module can fully fuse each feature information of the plurality of feature information based on an attention mechanism in the encoder, and the obtained first feature vector can more accurately represent the recall data.

According to some embodiments, pre-training the second transformer module before inputting the representation vector of each feature information of the plurality of feature information into the second transformer module.

In one implementation, the pre-training the second transformer module may include: sample data with a label is obtained, wherein the sample data includes the plurality of feature information; the representation vector of each feature information of the plurality of feature information of the sample data is input into the second transformer module to obtain a first feature vector of the sample data; the first feature vector is input into a classification model to obtain predictive classification of the sample data; and parameters of the second transformer module is adjusted based on the predictive classification and the label of the sample data.

Thus, the second transformer module may be pre-trained by connecting one classification model to an output end of the second transformer module to obtain a primary second transformer module that can adapt to a downstream task. On the basis of the pre-trained second transformer module, the training of the ranking model is executed to be capable of speeding up convergence of the model and improving a training effect.

In particular, the classification model may be a click prediction model.

At step S403, the parameter adjustment for the ranking model is only executed according to the recall data with the label. It may be understood that for the plurality of recall data, a user may only view some of them, that is, the user only gives feedback information of some of them. In this case, only the labels of part of the recall data that have been viewed can be obtained.

For example, for 200 ranked recall data, the user only views the first 10 recall data, that is, the user only judges the viewed first 10 recall data, such as clicking the third recall data without clicking other recall data. In this case, since the user does not judge the recall data other than the first 10 recall data, these data should not be applied in the parameter adjustment of the ranking model.

According to some embodiments, the label of each recall data of the at least one recall data may be determined based on at least one of the following information: a click information of the at least one recall data; or a matching information between each recall data of the at least one recall data and the data to be searched.

In one implementation, the clicked recall data may be assigned a larger value as a label, and the unclicked recall data can be assigned a smaller value as a label. For example, the label of the clicked recall data is 1, and the label of the unclicked recall data is 0.

In particular, the label may be further refined according to the number of times of clicks on each recall data, so that the value of the label value is positively related to the click rate.

In one implementation, the label of each recall data may be determined based on the matching information between each recall data of the at least one recall data and the data to be searched, wherein the value of the label is positively related to a matching degree.

In one implementation, the label of the recall data may further be determined according to a satisfaction degree of the recall data, wherein the value of the label is positively related to the satisfaction degree.

Figure 5:
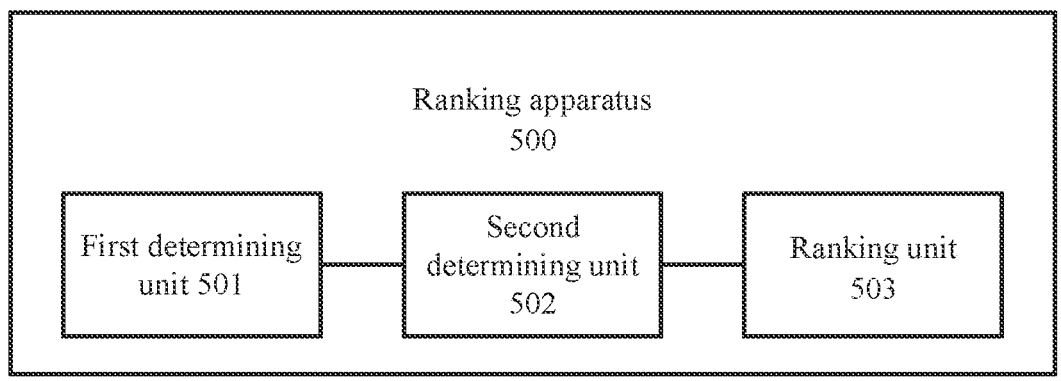
FIG. 5 shows a structural block diagram of an apparatus for ranking according to some embodiments of the present disclosure.

FIG. 5 shows a structural block diagram of an apparatus for ranking according to some embodiments of the present disclosure. The apparatus 500 includes: a first determining unit 501, configured to determine a plurality of recall data associated with data to be searched; a second determining unit 502, configured to determine, for each recall data of the plurality of recall data, a recommendation degree of the recall data in the plurality of recall data based on a similarity between the recall data and each recall data of the plurality of recall data; and a ranking unit 503, configured to rank the plurality of recall data based on the recommendation degree of each recall data of the plurality of recall data.

According to some embodiments, each recall data of the plurality of recall data has a respective first feature vector, and wherein the second determining unit includes: a fusing subunit, configured to fuse, based on a similarity between the first feature vector of the recall data and the first feature vector of each recall data of the plurality of recall data, the first feature vector of each recall data of the plurality of recall data to obtain a second feature vector of the recall data; and a first determining subunit, configured to determine the recommendation degree of the recall data in the plurality of recall data based on the second feature vector of the recall data According to some embodiments, the second determining unit includes: a subunit configured to input the first feature vector of each recall data of the plurality of recall data into a first transformer module to obtain the recommendation degree of the recall data in the plurality of recall data.

According to some embodiments, each recall data of the plurality of recall data includes a plurality of feature information, and the apparatus further includes: a third determining unit, configured to determine, for each recall data of the plurality of recall data, the first feature vector of the recall data by fusing the plurality of feature information of the recall data before determining the recommendation degree of the recall data in the plurality of recall data.

According to some embodiments, the third determining unit includes: a second determining subunit, configured to determine a representation vector of each feature information of the plurality of feature information; and a third determining subunit, configured to determine the first feature vector of the recall data by fusing the representation vector of each feature information of the plurality of feature information.

According to some embodiments, the third determining unit includes: an input subunit, configured to input the representation vector of each feature information of the plurality of feature information into a second transformer module to obtain the first feature vector of the recall data.

According to some embodiments, the input subunit includes: a subunit configured to arrange the representation vector of each feature information of the plurality of feature information according to a preset order to form a feature matrix of the recall data; and a subunit configured to input the feature matrix into the second transformer module.

According to some embodiments, the input subunit includes: a subunit configured to set, in response to absence of any feature information of the plurality of feature information, a preset default vector at a position of the feature information in the preset order.

According to some embodiments, the plurality of feature information of each recall data comprise feature information representing a similarity between the recall data and the data to be searched.

According to some embodiments, the plurality of feature information include at least one of: a numerical feature information, an enumerated feature information, or a vector feature information.

According to some embodiments, any one of the data to be searched and the plurality of recall data includes at least one of the following data types: a text; an image; or a video.

Figure 6:
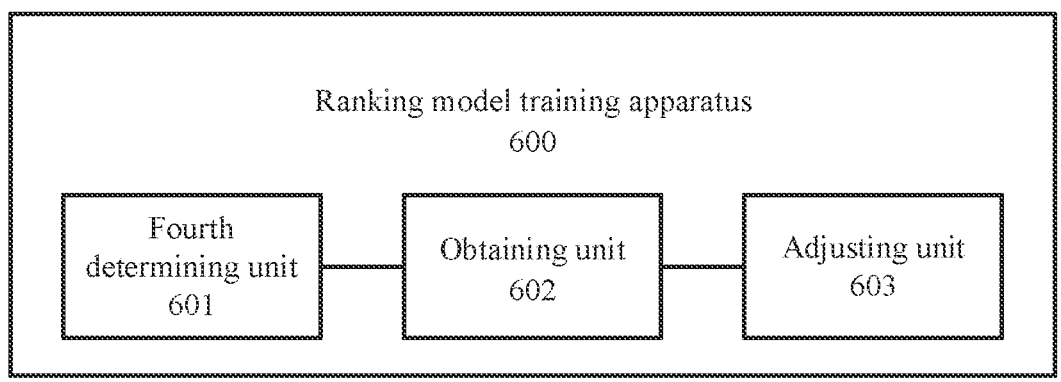
FIG. 6 shows a structural block diagram of an apparatus for training a ranking model according to some embodiments of the present disclosure.

FIG. 6 shows a structural block diagram of an apparatus for training a ranking model according to some embodiments of the present disclosure. The ranking model includes a first transformer module, and the apparatus 600 includes: a fourth determining unit 601, configured to determine a first feature vector of each recall data of a plurality of recall data associated with data to be searched; an obtaining unit 602, configured to input the first feature vector of each recall data of the plurality of recall data into the first transformer module to obtain a recommendation degree of each recall data of the plurality of recall data; and an adjusting unit 603, configured to adjust, in response to presence of at least one recall data with a label in the plurality of recall data, parameters of the ranking model based on the recommendation degree and the label of each recall data of the at least one recall data.

According to some embodiments, the label of each recall data of the at least one recall data is determined based on at least one of the following information: a click information of the at least one recall data; and a matching information between each recall data of the at least one recall data and the data to be searched.

According to some embodiments, the ranking model further includes a second transformer module, each recall data of the plurality of recall data includes a plurality of feature information, and the fourth determining unit includes: a subunit configured to determine a representation vector of each feature information of the plurality of feature information of the recall data; and a subunit configured to input the representation vector of each feature information of the plurality of feature information into the second transformer module to obtain the first feature vector of the recall data.

According to some embodiments, the apparatus further includes a pre-training unit, configured to pre-train the second transformer module before inputting the representation vector of each feature information of the plurality of feature information into the second transformer module.

According to some embodiments of the present disclosure, an electronic device is further provided, which includes: at least one processor; and a memory communicatively connected to the at least one processor, wherein the memory stores instructions executable by the at least one processor, wherein the instructions, when executed by the at least one processor, are configured to cause the at least one processor to implement any one of the above method.

According to some embodiments of the present disclosure, a non-transitory computer-readable storage medium storing computer instructions is further provided, wherein the computer instructions are configured to enable a computer to implement any one of the above method.

According to some embodiments of the present disclosure, a computer program product is further provided, which includes a computer program, wherein the computer program, when being executed by a processor, implements any one of the above method.

Figure 7:
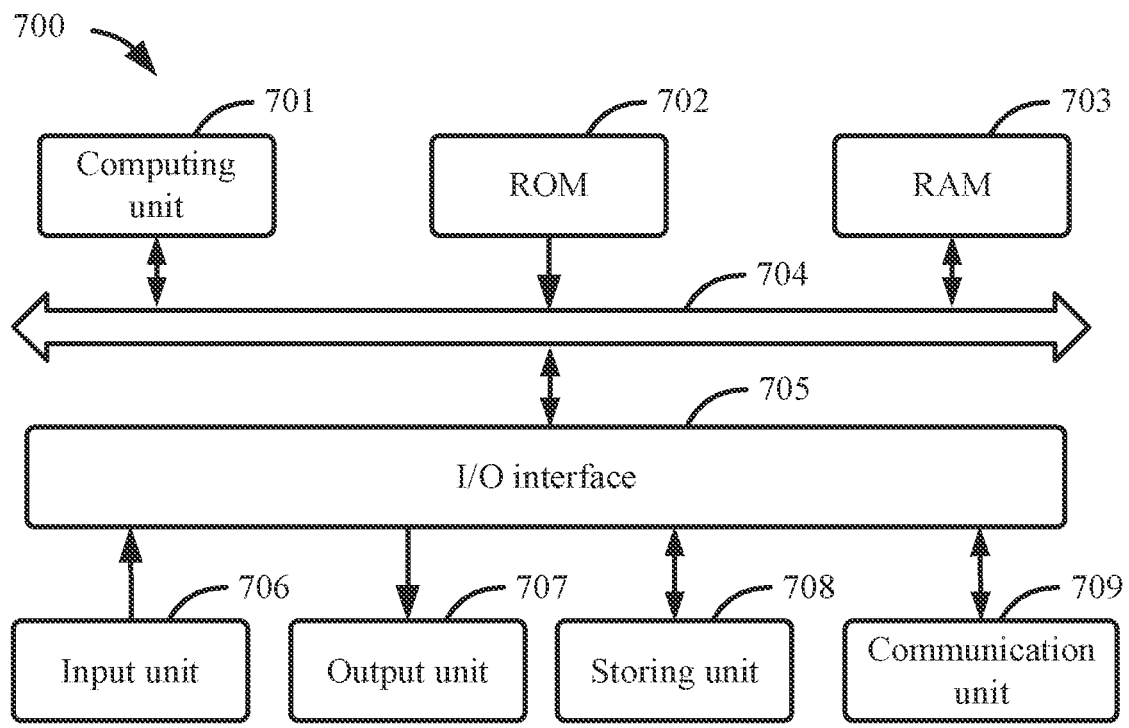
FIG. 7 shows a structural block diagram of an example electronic device capable of being used for implementing embodiments of the present disclosure.

Referring to FIG. 7, a structural block diagram of an electronic device 700 which can serve as a server or a client of the present disclosure will now be described, which is an example of a hardware device capable of being applied to all aspects of the present disclosure. The electronic device aims to express various forms of digital-electronic computer devices, such as a laptop computer, a desk computer, a work bench, a personal digital assistant, a server, a blade server, a mainframe computer and other proper computers. The electronic device may further express various forms of mobile apparatuses, such as a personal digital assistant, a cellular phone, an intelligent phone, a wearable device and other similar computing apparatuses. Parts shown herein, their connection and relations, and their functions only serve as an example, and are not intended to limit implementation of the present disclosure described and/or required herein.

As shown in FIG. 7, the electronic device 700 includes a computing unit 701, which may execute various proper motions and processing according to a computer program stored in a read-only memory (ROM) 702 or a computer program loaded from a storing unit 708 to a random access memory (RAM) 703. In the RAM 703, various programs and data required by operation of the electronic device 700 may further be stored. The computing unit 701, the ROM 702 and the RAM 703 are connected with one another through a bus 704. An input/output (I/O) interface 705 is also connected to the bus 704.

A plurality of parts in the electronic device 700 are connected to the I/O interface 705, and include: an input unit 706, an output unit 707, the storing unit 708 and a communication unit 709. The input unit 706 may be any type of device capable of inputting information into the electronic device 700, the input unit 706 may receive input digital or character information, generates key signal input relevant to user setting and/or functional control of the electronic device, and may include but is not limited to a mouse, a keyboard, a touch screen, a trackpad, a trackball, an operating lever, a microphone and/or a remote control. The output unit 707 may be any type of device capable of presenting information, and may include but is not limited to a display, a loudspeaker, a video/audio output terminal, a vibrator and/or a printer. The storing unit 708 may include but is not limited to a magnetic disc and an optical disc. The communication unit 709 allows the electronic device 700 to exchange information/data with other devices through a computer network such as Internet and/or various telecommunication networks, and may include but is not limited to a modem, a network card, an infrared communication device, a wireless communication transceiver and/or a chip set, such as a Bluetooth device, a 802.11 device, a WiFi device, a WiMax device, a cellular communication device and/or analogues.

The computing unit 701 may be various general and/or dedicated processing components with processing and computing capabilities. Some examples of the computing unit 701 include but are not limited to a central processing unit (CPU), a graphic processing unit (GPU), various dedicated artificial intelligence (AI) computing chips, various computing units running a machine learning model algorithm, a digital signal processor (DSP), and any proper processor, controller, microcontroller, etc. The computing unit 701 executes all the methods and processing described above, such as the method for ranking or the method for training a ranking model. For example, in some embodiments, the method for ranking or the method for training a ranking model may be implemented as a computer software program, which is tangibly contained in a machine readable medium, such as the storing unit 708. In some embodiments, part or all of the computer program may be loaded into and/or mounted onto the electronic device 700 via the ROM 702 and/or the communication unit 709. When the computer program is loaded to the RAM 703 and executed by the computing unit 701, one or more steps of the method for ranking or the method for training a ranking model described above may be executed. Alternatively, in other embodiments, the computing unit 701 may be configured to execute the method for ranking or the method for training a ranking model through any other proper modes (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally away from each other and usually interact through a communication network. A relationship of the client and the server is generated through computer programs run on a corresponding computer and mutually having a client-server relationship. The server may be a cloud server, or a server of a distributed system, or a server in combination with a blockchain.

It should be understood that various forms of flows shown above may be used to reorder, increase or delete the steps. For example, all the steps recorded in the present disclosure may be executed in parallel, and may also be executed sequentially or in different sequences, as long as the expected result of the technical solution disclosed by the present disclosure may be implemented, which is not limited herein.

Although the embodiments or examples of the present disclosure have been described with reference to the accompanying drawings, it should be understood that the above method, system and device are only example embodiments, and the scope of the present disclosure is not limited by these embodiments or examples, but only limited by the authorized claim and equivalent scope thereof. Various elements in the embodiments or the examples may be omitted or may be replaced with their equivalent elements. In addition, all the steps may be executed through the sequence different from that described in the present disclosure. Further, various elements in the embodiments or the examples may be combined in various modes. It is important that with evolution of the technology, many elements described here may be replaced with the equivalent element appearing after the present disclosure.

What is claimed is:

1. A computer-implemented method, comprising:
    acquiring, from a client device, data to be searched input by a user to the client device;
    determining a plurality of recall data associated with the data to be searched, wherein the data to be searched and the plurality of recall data comprise at least one of a text, an image, or a video, and wherein each recall data of the plurality of recall data comprises a plurality of feature information;
    determining, for each recall data of the plurality of recall data, a first feature vector of the recall data by fusing the plurality of feature information of the recall data, wherein determining the first feature vector of the recall data comprises:
        determining a representation vector of each feature information of the plurality of feature information; and
        determining the first feature vector of the recall data by fusing the representation vector of each feature information of the plurality of feature information, wherein the representation vector of each feature information of the plurality of feature information is arranged according to a preset order to form a feature matrix of the recall data, and the feature matrix is inputted to a second transformer encoder/decoder to obtain the first feature vector of the recall data;
    for each recall data of the plurality of recall data, inputting the respective first feature vector of the recall data into a first transformer encoder/decoder, wherein the first feature vector corresponds to a similarity between the recall data of the plurality of recall data;
    fusing, by the first transformer encoder/decoder, the respective first feature vectors of the plurality of recall data to obtain a second feature vector;
    determining, for each recall data of the plurality of recall data, a recommendation degree of the recall data based on a similarity between the recall data and each recall data of the plurality of recall data the second feature vector; and
    ranking the recall data in the plurality of recall data based on the recommendation degree of each recall data of the plurality of recall data.

2. The method according to claim 1, further comprising:
    setting, in response to absence of any feature information of the plurality of feature information, a preset default vector at a position of the feature information in the preset order.

3. The method according to claim 1, wherein the plurality of feature information of each recall data comprises a feature information representing a similarity between the recall data and the data to be searched.

4. The method according to claim 1, wherein the plurality of feature information comprises at least one of: a numerical feature information, an enumerated feature information, or a vector feature information.

5. An electronic device, comprising:
    a processor; and a memory communicatively connected to the processor, wherein the memory stores instructions executable by the processor, wherein the instructions, when executed by the processor, are configured to cause the processor to perform operations comprising:

acquiring, from a client device, data to be searched input by a user to the client device;

determining a plurality of recall data associated with the data to be searched, wherein the data to be searched and the plurality of recall data comprise at least one of a text, an image, or a video, and wherein each recall data of the plurality of recall data comprises a plurality of feature information;

determining, for each recall data of the plurality of recall data, a first feature vector of the recall data by fusing the plurality of feature information of the recall data, wherein determining the first feature vector of the recall data comprises:

determining a representation vector of each feature information of the plurality of feature information; and determining the first feature vector of the recall data by fusing the representation vector of each feature information of the plurality of feature information, wherein the representation vector of each feature information of the plurality of feature information is arranged according to a preset order to form a feature matrix of the recall data, and the feature matrix is inputted to a second transformer encoder/decoder to obtain the first feature vector of the recall data;

for each recall data of the plurality of recall data, inputting the respective first feature vector of the recall data into a first transformer encoder/decoder, wherein the first feature vector corresponds to a similarity between the recall data of the plurality of recall data;

fusing, by the first transformer encoder/decoder, the respective first feature vectors of the plurality of recall data to obtain a second feature vector;

determining, for each recall data of the plurality of recall data, a recommendation degree of the recall data based on a similarity between the recall data and each recall data of the plurality of recall data the second feature vector; and ranking the recall data in the plurality of recall data based on the recommendation degree of each recall data of the plurality of recall data.

6. The electronic device according to claim 5, wherein the operations further comprise:

setting, in response to absence of any feature information of the plurality of feature information, a preset default vector at a position of the feature information in the preset order.

7. The electronic device according to claim 5, wherein the plurality of feature information of each recall data comprises a feature information representing a similarity between the recall data and the data to be searched.

8. The electronic device according to claim 5, wherein the plurality of feature information comprises at least one of: a numerical feature information, an enumerated feature information, or a vector feature information.

9. A non-transitory computer-readable storage medium storing computer instructions that, when executed by a processor, enable a computer to perform operations comprising:

acquiring, from a client device, data to be searched input by a user to the client device;

determining a plurality of recall data associated with the data to be searched, wherein the data to be searched and the plurality of recall data comprise at least one of a text, an image, or a video, and wherein each recall data of the plurality of recall data comprises a plurality of feature information;

determining, for each recall data of the plurality of recall data, a first feature vector of the recall data by fusing the plurality of feature information of the recall data, wherein determining the first feature vector of the recall data comprises:

determining a representation vector of each feature information of the plurality of feature information; and determining the first feature vector of the recall data by fusing the representation vector of each feature information of the plurality of feature information, wherein the representation vector of each feature information of the plurality of feature information is arranged according to a preset order to form a feature matrix of the recall data, and the feature matrix is inputted to a second transformer encoder/decoder to obtain the first feature vector of the recall data;

for each recall data of the plurality of recall data, inputting the respective first feature vector of the recall data into a first transformer encoder/decoder, wherein the first feature vector corresponds to a similarity between the recall data of the plurality of recall data;

fusing, by the first transformer encoder/decoder, the respective first feature vectors of the plurality of recall data to obtain a second feature vector;

determining, for each recall data of the plurality of recall data, a recommendation degree of the recall data based on a similarity between the recall data and each recall data of the plurality of recall data the second feature vector; and ranking the recall data in the plurality of recall data based on the recommendation degree of each recall data of the plurality of recall data.

10. The non-transitory computer-readable storage medium according to claim 9, wherein the operations further comprise:

setting, in response to absence of any feature information of the plurality of feature information, a preset default vector at a position of the feature information in the preset order.

11. The non-transitory computer-readable storage medium according to claim 9, wherein the plurality of feature information of each recall data comprises a feature information representing a similarity between the recall data and the data to be searched.

12. The non-transitory computer-readable storage medium according to claim 9, wherein the plurality of feature information comprises at least one of: a numerical feature information, an enumerated feature information, or a vector feature information.

* * * * *